United States Patent
Katayama et al.

(10) Patent No.: US 9,619,184 B2
(45) Date of Patent: Apr. 11, 2017

(54) IMAGE FORMING APPARATUS

(71) Applicant: FUJI XEROX CO., LTD., Tokyo (JP)

(72) Inventors: Kenji Katayama, Kanagawa (JP); Akira Shirai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/609,509

(22) Filed: Jan. 30, 2015

(65) Prior Publication Data

US 2016/0085485 A1 Mar. 24, 2016

(30) Foreign Application Priority Data

Sep. 24, 2014 (JP) ................. 2014-194360

(51) Int. Cl.
*G06F 3/12* (2006.01)
*G06K 15/02* (2006.01)
*G06K 15/00* (2006.01)

(52) U.S. Cl.
CPC .......... *G06F 3/1208* (2013.01); *G06F 3/1234* (2013.01); *G06K 15/027* (2013.01); *G06K 15/1868* (2013.01); *G06K 15/408* (2013.01)

(58) Field of Classification Search
CPC ... G06F 3/1208; G06F 3/1234; G06K 15/027; G06K 15/1822; G06K 15/1868; G06K 15/1872; G06K 15/408
USPC ........................ 358/3.27, 1.9, 504
See application file for complete search history.

(56) References Cited

U.S. PATENT DOCUMENTS

| | | | | |
|---|---|---|---|---|
| 2004/0114157 A1* | 6/2004 | Linder | ............... | H04N 1/00002 358/1.9 |
| 2006/0126133 A1* | 6/2006 | Marquez | .............. | H04N 1/6052 358/504 |
| 2010/0238462 A1* | 9/2010 | Reitz | .................... | H04N 1/6055 358/1.9 |

FOREIGN PATENT DOCUMENTS

JP 2003-244438 8/2003

OTHER PUBLICATIONS

Abstract and machine translation of JP 2003-244438.

\* cited by examiner

*Primary Examiner* — Quang N Vo
(74) *Attorney, Agent, or Firm* — Fildes & Outland, P.C.

(57) ABSTRACT

There is provided an image forming apparatus. A transmitter is configured to transmit a test pattern in advance to another image forming apparatus when transferring print data to the another image forming apparatus. An acquirer is configured to acquire an optical reading result of an output of the test pattern made by the another image forming apparatus. A corrector is configured to correct the print data on the basis of the reading result so that the print data is output at the another image forming apparatus in the same quality as the image forming apparatus. A transfer unit is configured to transfer the corrected print data to the another image forming apparatus when the corrected print data does not include data which is not output at the another image forming apparatus in the same quality as the image forming apparatus.

11 Claims, 9 Drawing Sheets

FIG. 4

PRINTING CORRESPONDING AREA IN LONGITUDINAL DIRECTION

| NUMBER OF DOTS FROM END | CORRESPONDENCE SITUATION OF OWN APPARATUS 0: NON-CORRESPONDENCE, 1: CORRESPONDENCE | CORRESPONDENCE SITUATION OF ALTERNATIVE APPARATUS 0: NON-CORRESPONDENCE, 1: CORRESPONDENCE |
|---|---|---|
| 0 | 1 | 0 |
| 1 | 1 | 0 |
| 2 | 1 | 0 |
| 3 | 1 | 0 |
| ... | 1 | 0 |
| 100 | 1 | 0 |
| 101 | 1 | 1 |
| ... | 1 | 1 |
| MAXIMUM VALUE -101 | 1 | 1 |
| MAXIMUM VALUE -100 | 1 | 0 |
| ... | 1 | 0 |
| MAXIMUM VALUE | 1 | 0 |

NO PRINTING FUNCTION

NO PRINTING FUNCTION

FIG. 5

| LINE WIDTH CHARACTERISTIC IN LONGITUDINAL DIRECTION | | |
|---|---|---|
| LOGICAL LINE WIDTH (NUMBER OF DOTS) | OWN APPARATUS LINE WIDTH (NUMBER OF DOTS) | ALTERNATIVE APPARATUS LINE WIDTH (NUMBER OF DOTS) |
| 0 | 0 | 0 |
| 1 | 1 | 2 |
| 2 | 2 | 3 |
| 3 | 3 | 4 |
| ... | ... | ... |
| ... | ... | ... |

LINE OF ONE DOT: NON-CORRESPONDENCE

IMAGE FORMING APPARATUS

CROSS-REFERENCE TO RELATED APPLICATIONS

This application is based on and claims priority under 35 U.S.C.§119 from Japanese Patent Application No. 2014-194360 filed on Sep. 24, 2014.

TECHNICAL FIELD

The present invention relates to an image forming apparatus.

SUMMARY

According to an aspect of the exemplary embodiments of the present invention, there is provided an image forming apparatus comprising: a transmitter configured to transmit a test pattern in advance to another image forming apparatus when transferring print data to the another image forming apparatus; an acquirer configured to acquire an optical reading result of an output of the test pattern made by the another image forming apparatus; a corrector configured to correct the prim data on the basis of the reading result so that the print data is output at the another image forming apparatus in the same quality as the image forming apparatus; and a transfer unit configured to transfer the corrected print data to the another image forming apparatus when the corrected print data does not include data which is not output at the another image forming apparatus in the same quality as the image forming apparatus.

BRIEF DESCRIPTION OF THE DRAWINGS

Exemplary embodiments of the present invention will be described in detailed based on the following figures, wherein:

FIG. 4 is a table showing a printing corresponding area characteristic;

FIG. 5 is a table showing a line width characteristic;

DETAILED DESCRIPTION

Figure 1:
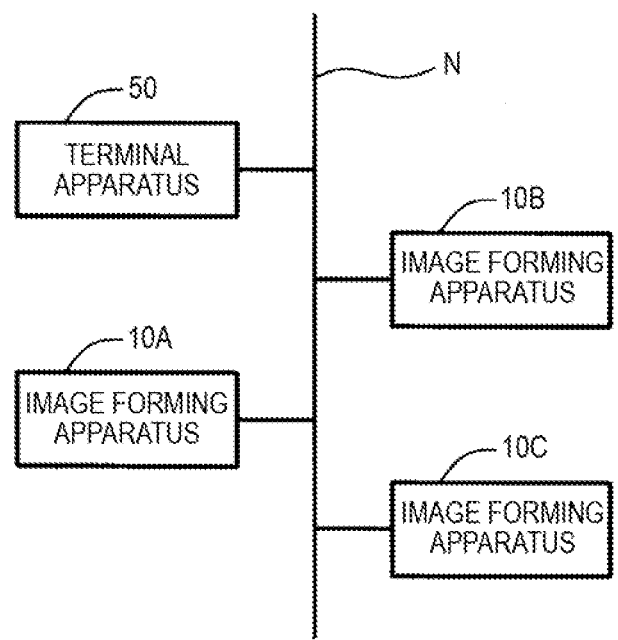
FIG. 1 is a block diagram showing an image forming system according to an illustrative embodiment of the present invention.

FIG. 1 shows an example of an image forming system according to an illustrative embodiment of the present invention. The image forming system includes a plurality of image forming apparatuses (for example, image forming apparatuses 10A, 10B, 10C). In the meantime, when it is not necessary to distinguish the image forming apparatuses 10A, 10B, 10C, the image forming apparatuses are collectively referred to as 'image forming apparatus 10'. The plurality of image forming apparatuses 10 is connected to a communication path N such as a network and the like. In the example of FIG. 1, the three image forming apparatuses 10 are included in the image forming system. This is just exemplary and a plurality of image forming apparatuses 10 other than the three image forming apparatuses may be included in the image forming system.

Also, a terminal apparatus 50 is connected to the communication path N. A plurality of terminal apparatuses 50 may also be connected to the communication path N. The terminal apparatus 50 is an apparatus such as a PC, a workstation, a smart phone, a portable phone and the like.

The image forming apparatus 10 and the terminal apparatus 50 have a function of transmitting data to other apparatus and a function of receiving data from the other apparatus. For example, the terminal apparatus 50 has a function of transmitting print data to the image forming apparatus 10. The image forming apparatus 10 has a function of printing print data transmitted from the terminal apparatus 50 and a function of transferring the print data to the other image forming apparatus 10.

The image forming apparatus 10 is an electrophotographic or inkjet printer, for example. The image forming apparatus 10 may also be a printer of the other type. Also, the image forming apparatus 10 has a scan function. The image forming apparatus 10 may further have at least one function of copy and facsimile functions. The image forming apparatus 10 is configured to form an image on a recording medium such as a recording sheet by using a color material (recording material) such as toner and ink. For example, the image forming apparatus 10 is configured to perform the printing by using toners of four colors of cyan (C), magenta (M), yellow (Y) and black (K). The toner of a special color can also be used.

In this illustrative embodiment, the image forming apparatus 10A is an inkjet printer and the image forming apparatuses 10B, 10C are electrophotographic printers, for example. This is just exemplary, and all of the image forming apparatuses 10A, 10B, 10C may be inkjet or electrophotographic printers. Alternatively, the image forming apparatus 10A may be an electrophotographic printer and the image forming apparatuses 10B, 10C may be inkjet printers.

The print data includes image data of a printing target and related information. Each pixel of the image data of the printing target is expressed by a combination of a plurality of values (density values) of color components (for example, cyan (C), magenta (M), yellow (Y) and black (K)). The related information includes image identification information (for example, image data ID) for identifying image data, printing position information indicating a position at which an image is to be printed, magnification information indicating a magnification of an image, information indicating created date and time of image data, user identification information (for example, user ID) for identifying a user who issues a printing instruction, and the like, for example. In addition, sheet information indicating a sheet size, layout information indicating a layout of an image, information indicating a capacity of image data, information indicating a data format and the like are included in the related information.

Figure 2:
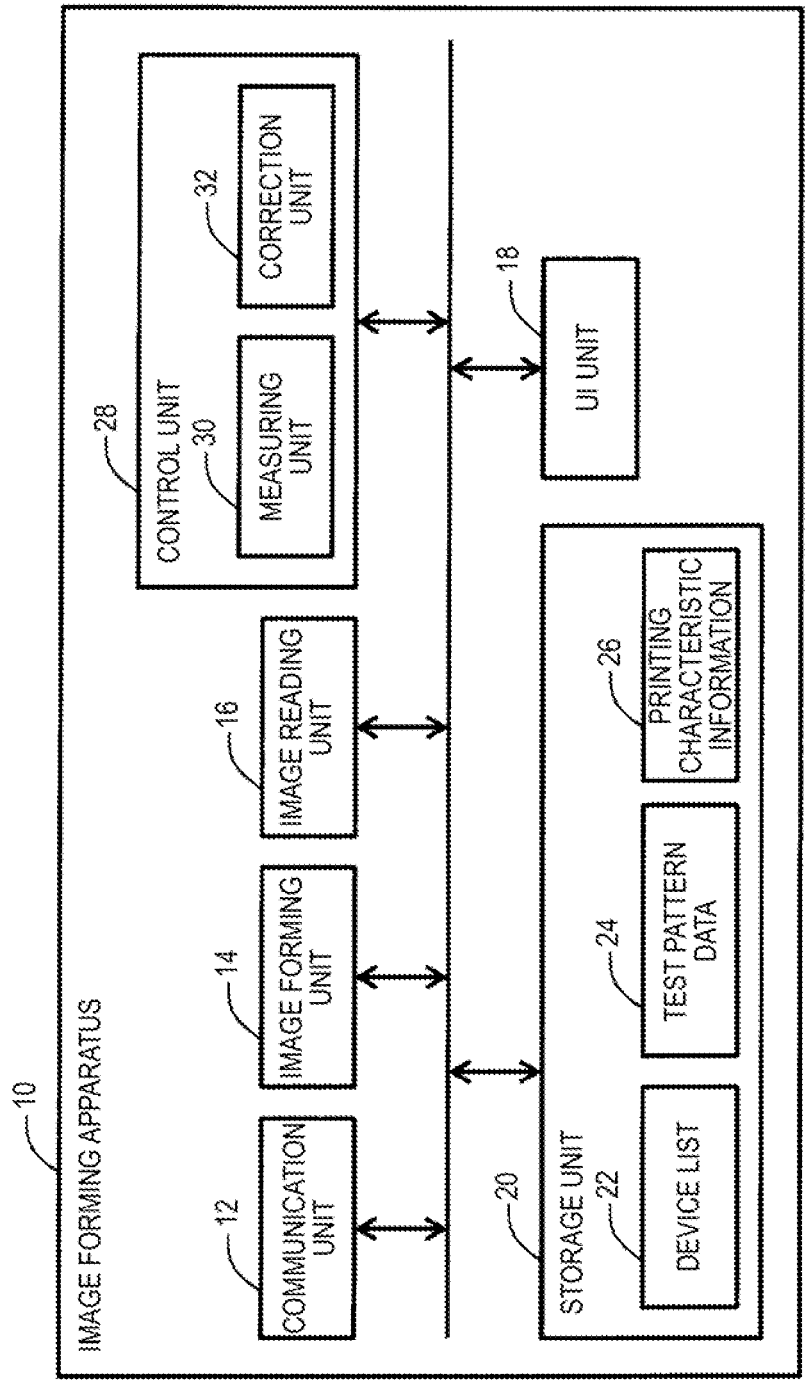
FIG. 2 is a block diagram showing an image forming apparatus according to the illustrative embodiment of the present invention.

FIG. 2 shows an example of the image forming apparatus 10.

A communication unit 12 is a communication interface connected to the communication path N. The communication unit 12 has a function of receiving data from other apparatus and a function of transmitting data to other apparatus. In this illustrative embodiment, the communication unit 12 is configured to receive print data from the terminal apparatus 50. Also, the communication unit 12 is configured to transmit the print data to the other image forming apparatus 10.

An image forming unit 14 is configured to form an image on a recording sheet in accordance with the image data. Thereby, the image data is printed on the recording sheet. The image forming unit 14 is configured to print the image data for each page, for example.

An image reading unit 16 is an image reading device such as a scanner and a digital camera. The image reading unit 16 is configured to generate electronic image data by reading an image on a recording sheet.

A user interface unit (UI unit) 18 includes an operation unit and a display unit. The operation unit is an input device such as an operation panel. The display unit is a display device such as a liquid crystal monitor.

A storage unit 20 is a storage device such as a hard disk drive. In the storage unit 20, the print data is stored. Also, in the storage unit 20, a device list 22, test pattern data 24 and printing characteristic information 26 are stored.

The device list 22 is information indicating all the image forming apparatuses 10 included in the image forming system. The device list 22 includes device identification information (for example, a device ID) for identifying each image forming apparatus 10 and address information (for example, an IP address) of each image forming apparatus 10. The device list 22 is prepared in advance and is stored in the storage unit 20.

The test pattern data 24 is data indicating a pattern for density characteristic confirmation, a pattern for printing corresponding area characteristic confirmation and a pattern for line width characteristic conformation, for example. The pattern for density characteristic confirmation, the pattern for printing corresponding area characteristic confirmation and the pattern for line width characteristic conformation may be configured by one test pattern or may be separate test patterns. The test patterns are exemplary. At least one of the pattern for density characteristic confirmation, the pattern for printing corresponding area characteristic confirmation and the pattern for line width characteristic conformation may be used as a test pattern or a separate pattern for printing characteristic confirmation may be used as a test pattern.

The pattern for density characteristic confirmation is a pattern for confirming a printing density characteristic of the image forming apparatus 10. The pattern for density characteristic confirmation may be a pattern configured by a plurality of patches having different density values, a gradation pattern expressed by a uniform density step from bright data to dark data, and the like. For example, the pattern for density characteristic confirmation for each of cyan (C), magenta (M), yellow (Y) and black (K) is prepared so that density characteristics of cyan (C), magenta (M), yellow (Y) and black (K) can be confirmed. That is, the pattern configured by a plurality of patches having different values (density values), the gradation pattern and the like are prepared for each of cyan (C), magenta (M), yellow (Y) and black (K). A density value of the test pattern (hereinafter, referred to as 'logical density value') is a predetermined or pre-measured value. By using the pattern for density characteristic confirmation, a density value by actual printing is measured with respect to the logical density value.

The pattern for printing corresponding area characteristic confirmation is a pattern for confirming a printing corresponding area characteristic of the image forming apparatus 10. The pattern for printing corresponding area characteristic confirmation is a pattern designated to be printed from one end of a recording sheet to the other end. By using the pattern for printing corresponding area characteristic confirmation, an area of the recording sheet to which the printing by the image forming apparatus 10 corresponds is measured.

The pattern for line width characteristic conformation is a pattern for confirming a line width characteristic of the image forming apparatus 10. The pattern for line width characteristic conformation is a pattern configured by a plurality of lines having different line widths. A line width of the test pattern (hereinafter, referred to as 'line width logical value') is a predetermined or pre-measured value. By using the pattern for line width characteristic confirmation, a line width by actual printing is measured with respect to the line width logical value.

In this illustrative embodiment, a test pattern is printed on the recording sheet by the image forming unit 14. Hereinafter, the recording sheet having the test pattern formed thereon is referred to as 'test pattern recording sheet'. The pattern for density characteristic confirmation, the pattern for printing corresponding area characteristic confirmation and the pattern for line width characteristic conformation may be configured by one test pattern and formed on one recording sheet or may be respectively formed on separate recording sheets. An image on the test pattern recording sheet is read by the image reading unit 16. Thereby, image data (hereinafter, referred to as 'test pattern read data') indicating the test pattern is generated. The test pattern read data is used to measure the printing characteristics of the image forming apparatus 10.

The printing characteristic information 26 is information indicating printing characteristics of the image forming apparatus 10 thereof (own apparatus) and the other image forming apparatuses 10. The printing characteristics include a density characteristic, a printing corresponding area characteristic and a line width characteristic, for example. The density characteristic, the printing corresponding area characteristic and the line width characteristic are measured by a measuring unit 30 on the basis of the test pattern read data.

A control unit 28 is configured to control operations of the respective units of the image forming apparatus 10. For example, the control unit 28 is configured to store the print data transmitted from the terminal apparatus 50 in the storage unit 20. Also, the control unit 28 is configured to detect a failure of the own apparatus. For example, the control unit 28 is configured to detect a failure (for example, color material jamming, sheet jamming and the like) of the image forming unit 14.

Also, the control unit 28 includes the measuring unit 30 and a correction unit 32.

The measuring unit 30 is configured to measure the printing characteristics on the basis of the test pattern read data. For example, the measuring unit 30 is configured to measure the density characteristic, the printing corresponding area characteristic and the line width characteristic. The information indicating the density characteristic, the printing corresponding area characteristic and the line width characteristic is stored in the storage unit 20, as the printing characteristic information 26.

For example, the measuring unit 30 is configured to measure actual density values with respect to the respective logical density values, based on the pattern for density characteristic confirmation indicated in the test pattern read data. The measuring unit 30 is configured to measure actual density values of each of cyan (C), magenta (M), yellow (Y)

and black (K), based on the test pattern read data of each of cyan (C), magenta (M), yellow (Y) and black (K).

Also, the measuring unit 30 is configured to measure an area corresponding to the printing by the image forming apparatus 10, based on the pattern for printing corresponding area characteristic confirmation indicated in the test pattern read data. For example, the measuring unit 30 is configured to confirm whether the pattern for printing corresponding area characteristic confirmation is actually printed from one end of the recording sheet to the other end, in a unit of one pixel. Thereby, an area that is actually printed (an area corresponding to the printing by the image forming apparatus 10) is measured in a unit of one pixel.

Also, the measuring unit 30 is configured to measure actual line widths with respect to the respective line width logical values, based on the pattern for line width characteristic confirmation indicated in the test pattern read data.

The correction unit 32 is configured to correct image data of a printing target so that the image data of the printing target is printed with designated conditions, based on the printing characteristic information 26. For example, the correction unit 32 is configured to correct at least one of the density value and line width of the image data. Specifically, the correction unit 32 is configured to correct the density value of the image data so that a density value of an image to be actually printed is the same as the density value designated in the image data, based on the logical density value and the actually measured density value. The correction unit 32 is configured to correct the density values of cyan (C), magenta (M), yellow (Y) and black (K) of the image data. Also, the correction unit 32 is configured to correct the line width of the image data so that a line width of an image to be actually printed is the same as the line width designated in the image data, based on the logical line width and the actually measured line width. The image forming unit 14 is configured to print the corrected image data.

In this illustrative embodiment, the test pattern (the pattern for density characteristic confirmation, the pattern for printing corresponding area characteristic confirmation and the pattern for line width characteristic conformation) is printed in advance by the image forming unit 14 of the image forming apparatus 10 (own apparatus), and the image on the test pattern recording sheet is read by the image reading unit 16 of the own apparatus. Thereby, the test pattern read data relating to the own apparatus is generated. The measuring unit 30 of the own apparatus is configured to measure the actual density values with respect to the respective logical density values, the area corresponding to the printing by the own apparatus, and the actual line widths with respect to the respective line width logical values, based on the test pattern read data of the own apparatus. The information indicating measurement results is stored in the storage unit 20, as the information (the printing characteristic information 26) indicating the printing characteristics of the own apparatus.

Also, in this illustrative embodiment, when the printing is not continuously performed due to a failure of the image forming apparatus 10 (own apparatus) during the printing, for example, the printing is continuously performed by the other image forming apparatus 10 (alternative apparatus). To this end, when the printing is not continuously performed in the own apparatus, the control unit 28 of the own apparatus displays a list of the device identification information of the image forming apparatus 10 indicated in the device list 22, on the display unit of the UI unit 18. A user selects the image forming apparatus 10, which will be used as an alternative apparatus, from the list by using the operation unit of the UI unit 18. When an alternative apparatus is selected, the control unit 28 of the own apparatus transfers the test pattern data 24 to the alternative apparatus and instructs the alternative apparatus to print the test pattern. The test pattern is printed on a recording sheet by the image forming unit 14 of the alternative apparatus. Thereby, a test pattern recording sheet is prepared by the alternative apparatus. An image on the test pattern recording sheet is read by the image reading unit 16 of the own apparatus. Thereby, test pattern read data relating to the alternative apparatus is generated. The measuring unit 30 of the own apparatus is configured to measure the actual density values with respect to the respective logical density values, the area corresponding to the printing by the alternative apparatus, and the actual line widths with respect to the respective line width logical values. The information indicating measurement results is stored in the storage unit 20, as the information (the printing characteristic information 26) indicating the printing characteristics of the alternative apparatus.

In the meantime, the characteristics of the image reading are general although they are different depending on the image reading unit 16. In this illustrative embodiment, in order to evaluate the printing characteristics of the own apparatus and alternative apparatus on the basis of the same criteria, the image on the test pattern recording sheet is read by the same image reading unit 16 (for example, the image reading unit 16 of the own apparatus). The image on the test pattern recording sheet may also be read by the image reading unit 16 of the image forming apparatus other than the own apparatus.

The control unit 28 is configured to determine whether the printing based on conditions designated in the image data can be implemented by the alternative apparatus. For example, when the printing based on the designated conditions can be implemented for all the not-printed image data by the alternative apparatus, without the correction or by performing the correction, the control unit 28 of the own apparatus transfers the print data to the alternative apparatus. At this time, the control unit 28 involves image data of a not-printed page in the print data. When correcting the image data, the correction unit 32 corrects the density value or line width of the image data so that the image data is printed on the basis of the designated conditions by the alternative apparatus. When the printing based on the designated conditions can be implemented without the correction, the correction by the correction unit 32 is not performed. When the corrected image data or the not-corrected image data is transferred to the alternative apparatus, the image data is printed by the alternative apparatus.

Also, when the printing based on the designated conditions cannot be implemented for a part or all of the not-printed image data by the alternative apparatus, i.e., when the printing based on the designated conditions cannot be implemented by the alternative apparatus even if the image data (density value or line width) is corrected, the control unit 28 of the own apparatus displays information indicating options of alternative processing, on the display unit of the UI unit 18. The alternative processing may include (1) processing of image data to be printed next time, (2) printing of a first page and thereafter of a copy under printing, (3) printing of a not-printed page, (4) printing abort, and the like, for example. The control unit 28 of the own apparatus is configured to execute the alternative processing selected by the user.

The image forming apparatus 10 is implemented by cooperation of hardware resources and software, for example. Specifically, the image forming apparatus 10 has a processor such as a CPU (not shown). The processor reads out and executes a program stored in a storage device (not shown), so that the functions of the respective units of the image forming apparatus 10 are implemented. The program is stored in the storage device via a recording medium such as a CD and a DVD or via the communication path such as the network. Alternatively, the respective units of the image forming apparatus 10 may also be implemented by hardware resources such as a processor and an electronic circuit. For the implementation, a device such as a memory may be used. Alternatively, the respective units of the image forming apparatus 10 may also be implemented by a DSP (Digital Signal Processor), an FPGA (Field Programmable Gate Array) and the like.

In the below, specific examples of the density characteristic, the printing corresponding area characteristic and the line width characteristic are described with reference to FIGS. 3 to 5.

Figure 3:
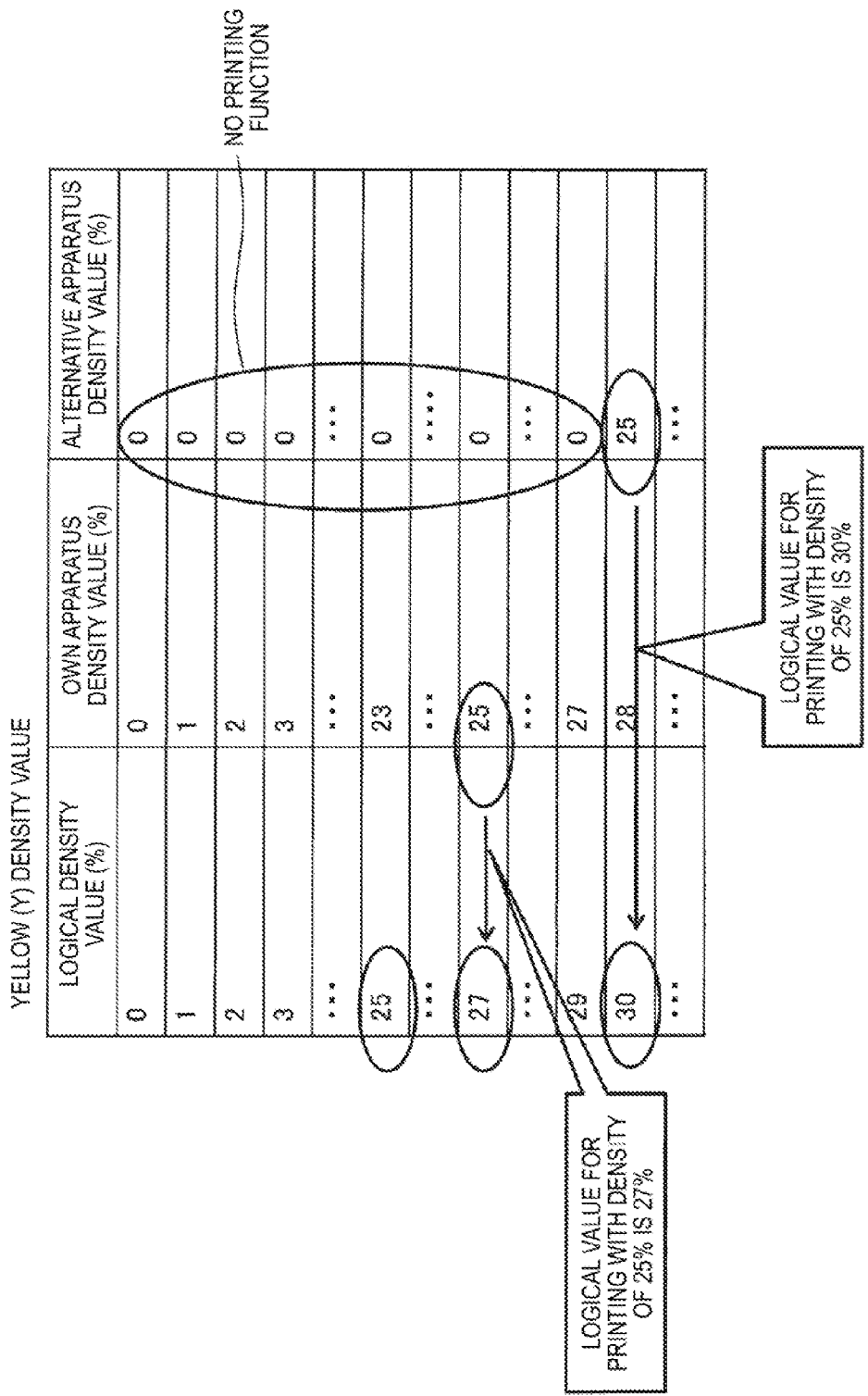
FIG. 3 is a table showing a density characteristic.

FIG. 3 shows an example of the density characteristic. FIG. 3 shows density values (%) relating to yellow (Y) of cyan (C), magenta (M), yellow (Y) and black (K), as an example of the density characteristic. A logical density value, an own apparatus density value and an alternative apparatus density value are associated, which are stored in the storage unit 20 of the own apparatus, as an example of the printing characteristic information 26.

The 'logical density value' is each density value of a test pattern (pattern for density characteristic confirmation).

The 'own apparatus density value' is an actual density value of a test pattern printed by the own apparatus. That is, the own apparatus density value is an actual density value when an image having a logical density value is printed at the own apparatus.

The 'alternative apparatus density value' is an actual density value of a test pattern printed by the other image forming apparatus 10 (alternative apparatus). That is, the alternative apparatus density value is an actual density value when an image having a logical density value is printed at the alternative apparatus.

The specific example shown in FIG. 3 is described. For example, when an image of which logical density value of yellow is 25% is printed by the own apparatus, a density value of an actually printed image (an own apparatus density value) is 23%. Also, when an image of which logical density value is 27% is printed by the own apparatus, an own apparatus density value is 25%. Therefore, when it is intended to print an image by the own apparatus so that an actual density value becomes 25%, it has only to change the yellow density value of the image data to 27%. For example, when 25% is designated as the yellow density value of the image data, the corresponding density value is corrected to 27% and then the own apparatus is enabled to perform the printing, so that an image of which actual density value is 25% is printed. The correction is performed by the correction unit 32 of the own apparatus.

Also, when an image of which logical density value of yellow is 30% is printed by the alternative apparatus, an alternative apparatus density value is 25%. Therefore, when it is intended to print an image by the alternative apparatus so that an actual density value becomes 25%, it has only to change the yellow density value of the image data to 30%. For example, when 25% is designated as the yellow density value of the image data, the corresponding density value is corrected to 30% and then the alternative apparatus is enabled to perform the printing, so that an image of which actual density value is 25% is printed. The correction is performed by the correction unit 32 of the own apparatus. Also, in the example of FIG. 3, the alternative apparatus does not have a function of printing an image of which actual density value is less than 25%. That is, the alternative apparatus does not have a function of printing an image in which a yellow density value less than 25% is designated. In this case, the control unit 28 of the own apparatus is configured to display the information indicating options of alternative processing on the display unit of the UI unit 18.

Also for cyan (C), magenta (M) and black (K), the own apparatus density value and the alternative apparatus density value are measured and the logical density value, the own apparatus density value and the alternative apparatus density value are associated, like the density characteristic shown in FIG. 3. The corresponding information is stored in the storage unit 20 of the own apparatus, as an example of the printing characteristic information 26.

FIG. 4 shows an example of the printing corresponding area characteristic. The printing corresponding area characteristic may depend on a physical mechanism of the image forming unit 14, in some cases. For example, a printing corresponding area may be different in longitudinal and lateral directions of a recording sheet. FIG. 4 shows a printing corresponding area in a longitudinal direction of a recording sheet, as an example of the printing corresponding area characteristic. A number of dots (a number of pixels) from an end, information indicating a correspondence situation of an own apparatus and information indicating a correspondence situation of an alternative apparatus are associated. The corresponding information is stored in the storage unit 20 of the own apparatus, as an example of the printing characteristic information 26.

The number of dots (the number of pixels) from an end corresponds to a position on a recording sheet at which a test pattern is formed. The test pattern (pattern for printing corresponding area confirmation) is formed from one end of the recording sheet to the other end. A position at which the number of dots is '0' corresponds to one end of the recording sheet, and a position at which the number of dots is 'maximum value' corresponds to the other end of the recording sheet.

The 'correspondence situation of an own apparatus' indicates an area on the recording sheet corresponding to the printing by the own apparatus. The 'correspondence situation of an alternative apparatus' indicates an area on the recording sheet corresponding to the printing by the alternative apparatus.

A value '0' in the table indicates non-correspondence and a value '1' indicates correspondence. In the example of FIG. 4, the own apparatus corresponds to an entire area. That is, the own apparatus has a function of printing an image over an entire area from one end (0) of a recording sheet to the other end (maximum value). On the other hand, the alternative apparatus does not correspond to an area having a number of dots from '0' to '100' and an area having a number of dots from 'maximum value−100' to 'maximum value'. That is, the alternative apparatus does not have a function of printing an image in the corresponding areas. Therefore, the alternative apparatus does not have a function of printing image data, which is designated to be printed in the corresponding areas, in conformity to the printing instruction. In this case, the control unit 28 of the own apparatus displays the information indicating options of alternative processing on the display unit of the UI unit 18.

Also for the lateral direction of the recording sheet, the corresponding areas of the own apparatus and the alternative apparatus are confirmed, and a number of dots (a number of pixels) from an end, information indicating a correspondence situation of an own apparatus and information indicating a correspondence situation of an alternative apparatus are associated, like the printing corresponding area characteristic shown in FIG. 4. The corresponding information is stored in the storage unit 20 of the own apparatus, as an example of the printing characteristic information 26.

Also, the printing corresponding area may be changed by a size of the recording sheet or a direction of the recording sheet on a conveyance path. Therefore, it may be possible to confirm a correspondence situation depending on the size or direction of the recording sheet and to store information indicating a confirmation result thereof in the storage unit 20 of the own apparatus, as an example of the printing characteristic information 26.

FIG. 5 shows an example of the line width characteristic. The line width characteristic may depend on a physical mechanism of the image forming unit 14. For example, when a resolution is different in longitudinal and lateral directions of a recording sheet, the line width characteristic may be different in the longitudinal and lateral directions of the recording sheet. FIG. 5 shows a line width characteristic in a longitudinal direction of a recording sheet, as an example of the line width characteristic. A logical line width, an own apparatus line width and an alternative apparatus line width are associated. The corresponding information is stored in the storage unit 20 of the own apparatus, as an example of the printing characteristic information 26.

The 'logical line width' is a line width of the test pattern (pattern for line width characteristic confirmation). A plurality of lines of which a width is changed by one dot (pixel) is used as the test pattern.

The 'own apparatus line width' is an actual line width of a test pattern printed by the own apparatus. That is, the own apparatus line width is an actual line width when an image having a logical line width is printed at the own apparatus.

The 'alternative apparatus line width' is an actual line width of a test pattern printed by the alternative apparatus. That is, the alternative apparatus line width is an actual line width when an image having a logical line width is printed at the alternative apparatus.

In the example of FIG. 5, the own apparatus line width is the same as the logical line width. That is, a test pattern is printed without a change in line width at the own apparatus. Therefore, an image is printed with a designated line width at the own apparatus.

On the other hand, a line is printed to be thicker than the logical line width by one dot (pixel) at the alternative apparatus. Therefore, in order to print an image with a designated line width by the alternative apparatus, it is preferably to correct the designated line width and to thus make the same thinner by one dot. The correction is performed by the correction unit 32 of the own apparatus. For example, when an image having a line width of 2 dots is printed at the alternative apparatus, the alternative apparatus line width is 3 dots. Therefore, when 2 dots are designated as a line width of image data, the line width is corrected to one dot and then the printing is performed by the alternative apparatus, so that an image having an actual line width of 2 dots is printed. In the example of FIG. 5, the alternative apparatus does not correspond to a line printing of one dot. Therefore, a line of one dot is not printed at the alternative apparatus.

In the meantime, also for the lateral direction of the recording sheet, an own apparatus line width and an alternative apparatus line width are measured, and a logical line width, an own apparatus line width and an alternative apparatus line width are associated, like the line width characteristic shown in FIG. 5. The corresponding information is stored in the storage unit 20 of the own apparatus, as an example of the printing characteristic information 26.

Figure 6:
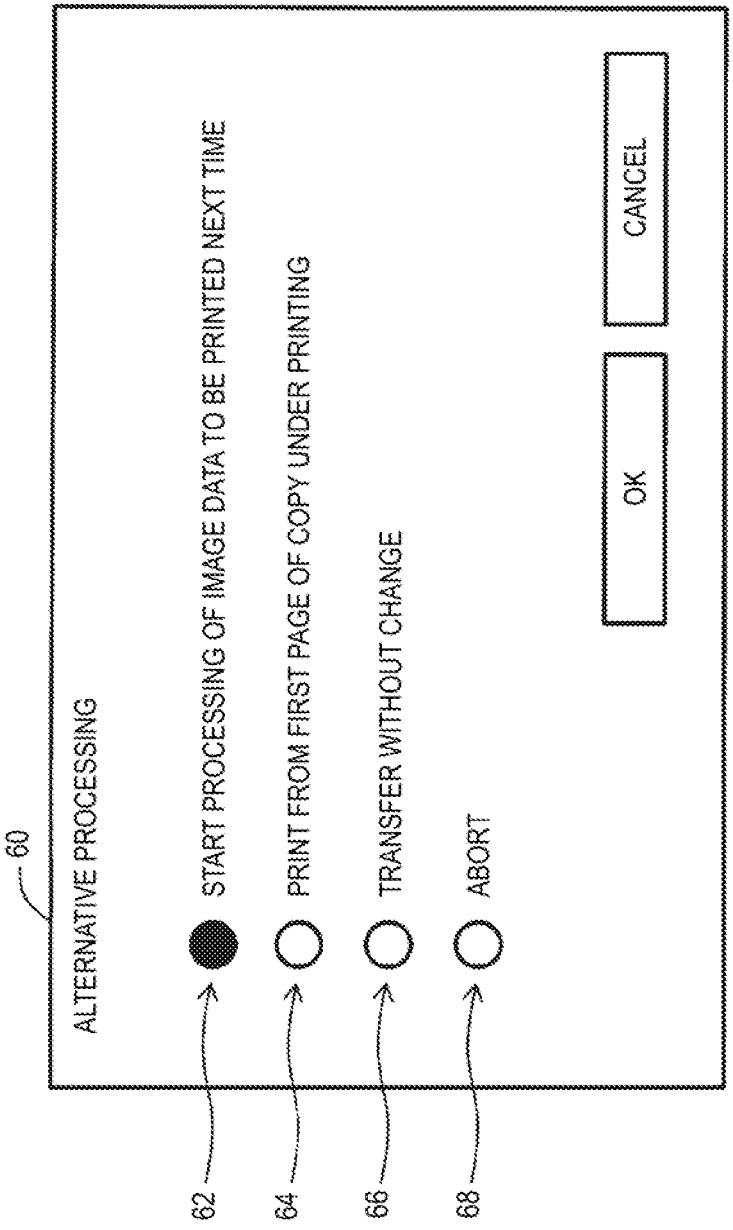
FIG. 6 illustrates an example of an option screen.

FIG. 6 illustrates an example of a screen for selecting an option of alternative processing. A screen 60 is a screen of the UI unit 18 of the own apparatus. When a part or all of not-printed image data cannot be printed on the basis of the designated conditions by the alternative apparatus, the control unit 28 of the own apparatus displays the information indicating options of alternative processing on the display unit. That is, when the printing cannot be implemented on the basis of the designated conditions by the alternative apparatus even if the image data is corrected, options of alternative processing are displayed.

An option 62 is an option for instructing processing of image data to be printed next time. When the option 62 is selected by a user, the control unit 28 of the own apparatus stops the printing of the image data being printed. Then, the control unit 28 determines whether the image data to be printed next time is to be printed on the basis of the designated conditions by the alternative apparatus. Specifically, the control unit 28 compares the conditions (the density value, the printing area and the line width) designated in the image data to be printed next time with the printing characteristic information 26 (the density characteristic, the printing corresponding area characteristic and the line width characteristic) of the alternative apparatus and determines whether the printing based on the corresponding conditions can be implemented by the alternative apparatus. For example, when all the image data to be printed next time can be printed based on the designated conditions by the alternative apparatus, without the correction or by performing the correction, the control unit 28 transfers the image data to be printed next time to the alternative apparatus. At this time, when the printing based on the designated conditions can be implemented by correcting the image data to be printed next time, the correction unit 32 corrects the density value and line width of the image data to be printed next time, based on the printing characteristic information 26 of the alternative apparatus. Then, the control unit 28 transfers the corrected image data to the alternative apparatus. When the printing based on the designated conditions can be implemented without the correction by the alternative apparatus, the control unit 28 transfers the not-corrected image data to the alternative apparatus. Thereby, the image data to be printed next time is printed at the alternative apparatus. On the other hand, when a part or all of the image data to be printed next time cannot be printed based on the designated conditions by the alternative apparatus even if the correction is performed, options 64, 66, 68 are displayed with respect to the image data to be printed next time.

The option 64 is an option for instructing a printing of a first page and thereafter of a copy under printing when an instruction to print a plurality of copies is issued. When the option 64 is selected by the user, the control unit 28 of the own apparatus transfers image data of a first page and thereafter of a copy to the alternative apparatus and instructs the alternative apparatus to print a first page and thereafter. For example, when printing an image of 10 pages by three copies, if a failure occurs at a point of time at which the printing has been completed up to a five page of a second copy, the control unit 28 transfers the image data of the first page and thereafter of the second copy to the alternative apparatus. That is, the control unit 28 transfers the image data of all pages of second and third copies to the alternative apparatus. Thereby, the printing is performed from the first page of the second copy and the image data of the second and third copies is printed at the alternative apparatus. At this time, when there is image data that is to be printed on the basis of the designated conditions by the alternative apparatus through the correction, the correction unit 32 of the own apparatus corrects the density value and line width of the image data, based on the printing characteristic information 26 of the alternative apparatus. Thereby, the corrected image data is transferred and printed at the alternative apparatus.

The option 66 is an option for instructing a printing of a not-printed page. When the option 66 is selected by the user, the control unit 28 of the own apparatus transfers image data of a next page and thereafter of a printing-completed page to the alternative apparatus. At this time, when there is image data that is to be printed on the basis of the designated conditions through the correction, the correction unit 32 of the own apparatus corrects the density value and line width of the image data, based on the printing characteristic information 26 of the alternative apparatus. Thereby, the corrected image data is transferred and printed at the alternative apparatus.

The option 68 is an option for instructing a printing abort. When the option 68 is selected by the user, the control unit 28 of the own apparatus aborts the printing.

Figure 7:
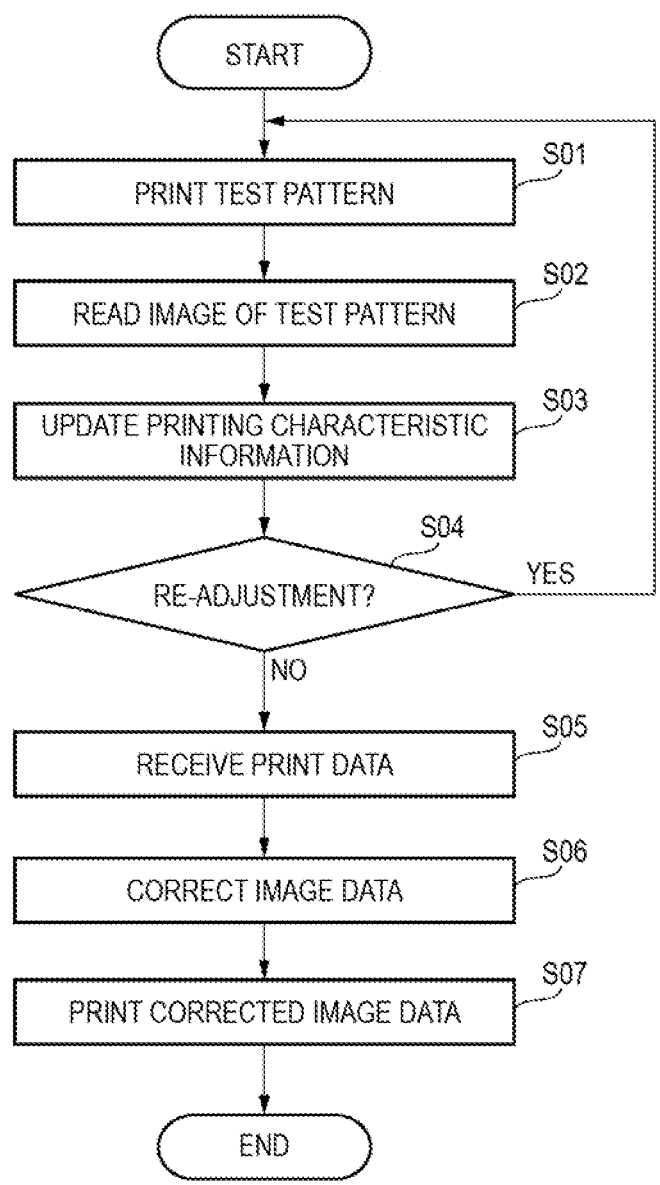
FIG. 7 is a flowchart showing an example of processing that is performed when printing is made at an own apparatus.

In the below, the processing that is performed when the printing is made at the own apparatus is described with reference to a flowchart shown in FIG. 7. The printing using the image forming apparatus 10A is exemplified.

First, when the user or operator uses the operation unit of the UT unit 18 of the image forming apparatus 10A to instruct a printing of a test pattern, the image forming unit 14 of the image forming apparatus 10A prints an image on a recording sheet in accordance with the test pattern data 24 (S01). Thereby, a test pattern recording sheet is prepared. Then, the image reading unit 16 of the image forming apparatus 10A reads an image on the test pattern recording sheet (S02). Thereby, test pattern read data is generated. Then, the measuring unit 30 measures the printing characteristics (for example, the density characteristic, the printing corresponding area characteristic and the line width characteristic) of the own apparatus, based on the test pattern read data, and updates the printing characteristic information 26 of the own apparatus (S03). That is, the measuring unit 30 of the image forming apparatus 10A measures an actual density value, a printing corresponding area and an actual line width and stores the same in the storage unit 20, as the printing characteristic information 26 of the own apparatus. When the user or operator issues a re-adjustment instruction (re-printing of a test pattern) (S04, Yes), a test pattern is again printed (S01) and an image on the test pattern recording sheet is read (S02). Then, the measuring unit 30 measures the printing characteristics of the own apparatus. When the printing of the test pattern and the reading of the image are performed in plural times, the measuring unit 30 stores an average value of the measurement results in the storage unit 20, as the printing characteristic information 26 of the own apparatus. For example, an average value of the density values, a determination result (a more side of the correspondence and the non-correspondence) of the printing corresponding areas and an average value of the line widths are calculated, which are then stored in the storage unit 20, as the printing characteristic information 26 of the own apparatus. For example, the printing characteristic information 26 shown in FIGS. 3 to 5 is stored in the storage unit 20. When there is no re-adjustment (S04, No), the processing proceeds to step S05. In the meantime, the processing of steps S01 to 04 has been executed in advance.

Then, when the user transmits print data to the image forming apparatus 10A by using the terminal apparatus 50, the communication unit 12 of the image forming apparatus 1 OA receives the print data (S05). The correction unit 32 of the image forming apparatus 1 OA refers to the printing characteristic information 26 of the own apparatus to correct the image data so that the image data is printed on the basis of the designated conditions (S06). For example, describing the density characteristic shown in FIG. 3, when 25% is designated as the yellow density value of the image data, the correction unit 32 corrects the density value to 27%. The corrected image data is printed, so that an image of which actual density value is 25% is printed. Describing the line width characteristic shown in FIG. 5, the line width of the own apparatus is the same as the logical line width. Therefore, it is not necessary to correct the line width. That is, an image having a designated line width is printed even if the line width is not corrected.

When the image data is corrected by the correction unit 32, the image forming unit 14 of the image forming apparatus 10A prints an image on the recording sheet in accordance with the corrected image data (S07). Thereby, an image is printed with the designated conditions (the density value and the line width). On the other hand, when an image can be printed on the basis of the designated conditions without correcting the image data, i.e., when the own apparatus density value and the own apparatus line width are the same as the logical values, an image is printed on the recording sheet in accordance with the not-corrected image data.

Figure 8:
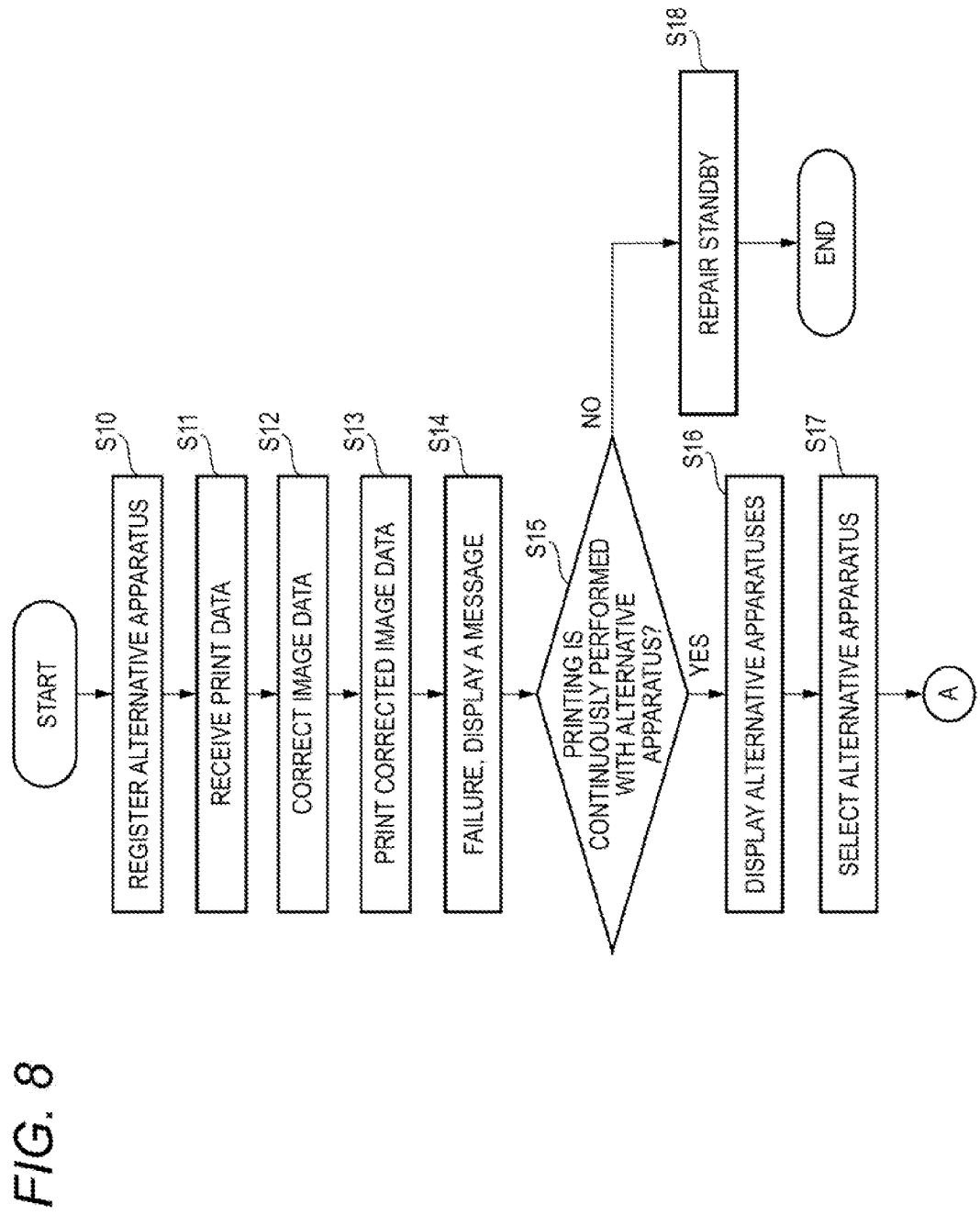
FIG. 8 is a flowchart showing an example of processing that is performed when printing is made at an alternative apparatus.

In the below, the processing that is performed when the printing is made at the alternative apparatus is described with reference to flowcharts shown in FIGS. 8 and 9. Also, it is assumed that the own apparatus is the image forming apparatus 10A, for example.

First, the user or operator uses the image forming apparatus 10 or terminal apparatus 50 to register an alternative apparatus (S10). Specifically, the user or operator inputs a device ID and address information of the alternative apparatus by using the operation unit of the image forming apparatus 10 or terminal apparatus 50. The image forming apparatus 10 or terminal apparatus 50 prepares the device list 22, based on the device ID and address information. The device list 22 is stored in the storage unit 20 of the image forming apparatus 10. In the meantime, the alternative apparatus has been registered in advance.

When the user transmits print data to the image forming apparatus 10 OA by using the terminal apparatus 50, the communication unit 12 of the image forming apparatus 10A receives the print data (S11). The correction unit 32 of the image forming apparatus 10A refers to the printing characteristic information 26 of the own apparatus to correct the image data so that the image data is printed with the designated conditions (S12). Thereby, the density value and line width of the image data are corrected. On the other hand, when an image can be printed on the basis of the designated conditions without correcting the image data, i.e., when the own apparatus density value and the own apparatus line width are the same as the logical values, an image is printed on the recording sheet in accordance with the not-corrected image data.

When a failure occurs in the image forming apparatus 10A during the printing, the control unit 28 of the image forming apparatus 10A detects the failure. When the printing is not continuously performed, the control unit 28 displays a message, which indicates that a failure occurs and the printing is thus aborted, on the display unit of the UI unit 18 (S14). For example, when the image forming apparatus 10A is an inkjet printer, the printing may be aborted due to a jamming of inkjet nozzles, and the like, for example. Then, the control unit 28 displays a selection screen for selecting whether or not to continue the printing by the alternative apparatus, on the display unit. When the user selects the continuing printing by using the operation unit (S15, Yes), the control unit 28 refers to the device list 22 to display a list of the registered image forming apparatuses 10 (alternative apparatuses) on the display unit (S16). The user selects an alternative apparatus from the list by using the operation unit (S17). For example, it is assumed that the image forming apparatuses 10B, 10C are registered and the image forming apparatus 10B is selected as the alternative apparatus. On the other hand, when the continuing printing is not selected (S15, No), the processing is over and the image forming apparatus 10A waits for a repair (S18).

Figure 9:
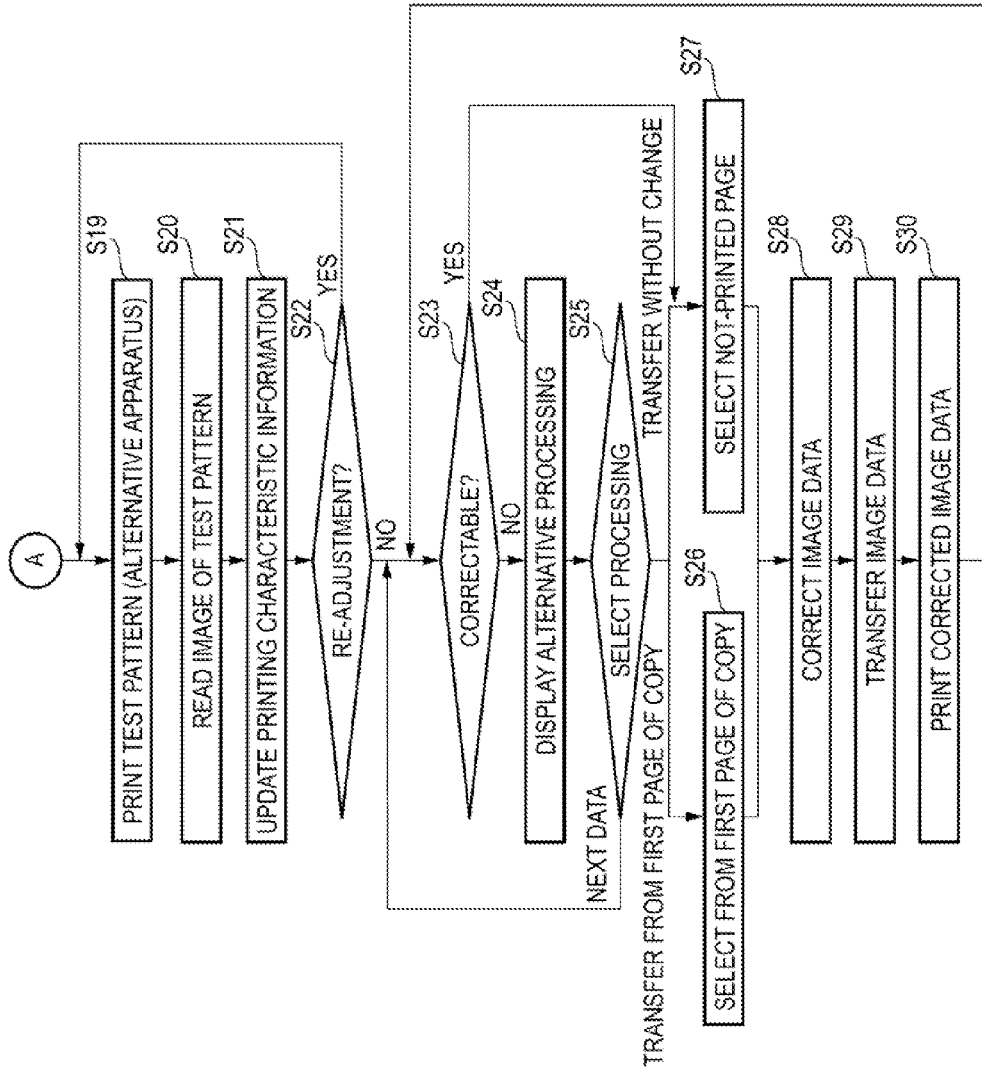
FIG. 9 is a flowchart showing an example of processing that is performed when printing is made at the alternative apparatus.

FIG. 9 shows processing after step S17. When the image forming apparatus 10B is selected as the alternative apparatus, as described above, the control unit 28 of the image forming apparatus 10A transmits the test pattern data 24 to the image forming apparatus 10B (alternative apparatus). The image forming unit 14 of the image forming apparatus 10B prints a test pattern on a recording sheet (S19). Thereby, a test pattern recording sheet relating to the alternative apparatus is prepared. An image on the test pattern recording sheet is read by the image reading unit 16 of the image forming apparatus 10A (own apparatus) (S20). Thereby, test pattern read data relating to the alternative apparatus is generated. Then, the measuring unit 30 of the image forming apparatus 10A measures the printing characteristics (for example, the density characteristic, the printing corresponding area characteristic and the line width characteristic) of the alternative apparatus, based on the test pattern read data, and updates the printing characteristic information 26 of the alternative apparatus (S21). That is, the measuring unit 30 of the image forming apparatus 10A measures an actual density value, a printing corresponding area and an actual line width and stores the same in the storage unit 20, as the printing characteristic information 26 of the alternative apparatus. When the user or operator issues a reconfiguration instruction (re-printing of a test pattern) (S22, Yes), a test pattern is again printed by the image forming apparatus 10B (S19) and an image on the test pattern recording sheet is read by the image forming apparatus 10A (S20). Then, the measuring unit 30 measures the printing characteristics of the alternative apparatus. When the printing of the test pattern and the reading of the image are performed in plural times, the measuring unit 30 stores an average value of the measurement results in the storage unit 20, as the printing characteristic information 26 of the alternative apparatus. For example, an average value of the density values, a determination result (a more side of the correspondence and the non-correspondence) of the printing corresponding areas and an average value of the line widths are calculated, which are then stored in the storage unit 20, as the printing characteristic information 26 of the alternative apparatus. For example, the printing characteristic information 26 shown in FIGS. 3 to 5 is stored in the storage unit 20. When there is no re-adjustment (S22, No), the processing proceeds to step S23.

In the meantime, the processing of steps S19 to S22 may be executed in advance before a failure occurs in the image forming apparatus 10A. The printing characteristics of the image forming apparatus 10 may be changed over time. Therefore, when the processing of steps S19 to S22 is executed just after a failure occurs in the image forming apparatus 10A, it is possible to measure the printing characteristics on which a change over time is less influenced, as compared to a configuration where the processing of steps S19 to S22 is executed in advance before a failure occurs.

The control unit 28 of the image forming apparatus 10A refers to the printing characteristic information 26 (the alternative apparatus density value, the printing corresponding area of the alternative apparatus and the alternative apparatus line width) of the image forming apparatus 10B to determine whether the printing based on the conditions designated in the image data can be implemented by the image forming apparatus 10B. That is, the control unit 28 of the image forming apparatus 10A determines whether the printing based on the designated conditions can be implemented for all the not-printed image data by the alternative apparatus, without the correction or by performing the correction. When the printing based on the designated conditions can be implemented for all the not-printed image data, without the correction or by performing the correction (S23, Yes), the processing proceeds to step S27.

In step S27, the control unit 28 of the image forming apparatus 1OA selects the image data of the not-printed page, as transfer data. The correction unit 32 of the image forming apparatus 10A refers to the printing characteristic information 26 of the image forming apparatus 10B to correct the image data (density value and line width) of the not-printed page so that the image data of the not-printed page is printed on the basis of the designated conditions by the s5 image forming apparatus 10B (S28). When the image data is corrected by the correction unit 32, the control unit 28 of the image forming apparatus 10A transfers print data including the corrected image data to the image forming apparatus 10B (S29). Then, the image forming unit 14 of the image forming apparatus 10B prints an image on the recording sheet, in accordance with the corrected image data (S30). Thereby, an image of the page that is not printed at the image forming apparatus 10 OA is printed on the recording sheet on the basis of the designated conditions (density value and line width). On the other hand, when an image can be printed on the basis of the designated conditions without correcting the image data, i.e., when the alternative apparatus density value and the alternative apparatus line width are the same as the logical values, the not-corrected image data is transferred to the image forming apparatus 10B. Thereby, an image is printed on the recording sheet in accordance with the not-corrected image data. Then, the processing of step S23 and thereafter is executed for next image data.

On the other hand, when the printing based on the designated conditions cannot be implemented for a part or all of the not-printed image data by the alternative apparatus (S23, No), i.e., when there is an image that cannot be printed on the basis of the designated conditions by the alternative apparatus even if the image data (density value and line width) is corrected, the control unit 28 of the image forming apparatus 1 OA displays the information indicating the options of alternative processing on the display unit of the UI unit 18 (S24). For example, the control unit 28 displays the options 62 to 68 shown in FIG. 6 on the display unit.

For example, as shown in FIG. 3, the image forming apparatus 10B (alternative apparatus) does not have a function of printing image data in which a yellow density value less than 25% is designated. Therefore, when a yellow density value less than 25% is designated in the not-printed image data, it is determined that the printing based on the designated conditions cannot be implemented by the alternative apparatus (S23, No), and the processing proceeds to S24.

Also, as shown in FIG. 4, the image forming apparatus 10B (alternative apparatus) does not have a function of printing an image over an area from an end of the recording sheet to 100 dots. Therefore, when there is an object of a printing target over an area from an end to 1001 dots in the not-printed image data, it is determined that the printing based on the designated conditions cannot be implemented by the alternative apparatus (S23, No), and the processing proceeds to S24.

Also, as shown in FIG. 5, the image forming apparatus 10B (alternative apparatus) does not have a function of printing a line having a line width of one dot. Therefore, when there is a line having a line width of one dot in the not-printed image data, it is determined that the printing based on the designated conditions cannot be implemented by the alternative apparatus (S23, No), and the processing proceeds to S24.

In the meantime, the control unit 28 of the own apparatus may be configured to display the printing characteristic, for which the printing based on the designated conditions cannot be implemented even if the correction is performed, on the display unit. In the examples of FIGS. 3 to 5, the information indicating the density characteristic, the printing corresponding area characteristic and the line width characteristic is displayed. Specifically, a message indicating that an image having a yellow density value less than 25% is not printed, a message indicating that an object existing in a range from an end to 100 dots is not printed and a message indicating that a line having a line width of one dot is not printed are displayed. More specifically, a sentence 'a character string (ab) of a character string (abcdef) located at a position within yy (cm) from left and zz (cm) from above of xx page is not printed', a sentence 'a part having a yellow density value less than 25% of an image located at a position within yy (cm) from left and zz (cm) from above of xx page is not printed' and the like are displayed. Thereby, the user can easily check the corresponding place. Also, the control unit 28 may be configured to display only an uncorrectable page or uncorrectable part with being highlighted on the display unit. The control unit 28 may be configured to execute a test printing of an uncorrectable page or part after receiving an instruction to perform the test printing from the user.

When the user selects the option 62 (option for instructing processing of image data to be printed next time) on the screen 60 shown in FIG. 6 (step S25, next data), the processing returns to step S23. Then, the processing is executed for the image data to be printed next time. In this case, the control unit 28 of the image forming apparatus 10A aborts the printing of the image data being printed. The control unit 28 of the image forming apparatus 10A refers to the printing characteristic information 26 of the image forming apparatus 10B to determine whether the printing based on the designated conditions can be implemented for the image data to be printed next time by the image forming apparatus 10B. When the printing based on the designated conditions can be implemented for all the image data to be printed next time without the correction or by performing the correction (S23, Yes), the processing proceeds to step S27. Then, the processing of steps S27 to S30 is executed for the image data to be printed next time.

On the other hand, when the printing based on the designated conditions cannot be implemented for a part or all of the image data to be printed next time by the alternative apparatus (S23, No), the processing proceeds to step S24. Then, the processing of step S24 and thereafter is executed for the image data to be printed next time.

Also, in step S25, when the user selects the option 64 (option for instructing a printing of a first page and thereafter of a copy under printing) (step S25, transfer is performed from a first page of a copy), the processing proceeds to step S26.

In step S26, the control unit 28 of the image forming apparatus 10A selects image data of a first page and thereafter of a copy under printing, as transfer data. For example, when printing an image of 10 pages by three copies, if a failure occurs at a point of time at which the printing has been completed up to a five page of a second copy, the control unit 28 selects image data of a first page and thereafter of the second copy, as the transfer data. Thereby, the image data of all pages of the second and third copies is selected as the transfer data. When there is image data that is to be printed on the basis of the designated conditions through the correction by the alternative apparatus, the correction unit 32 of the image forming apparatus 10A corrects the image data (density value and line width) on the basis of the printing characteristic information 26 of the image forming apparatus 10B (S28). Then, the control unit 28 of the image forming apparatus 10A transfers print data including the image data of the first page and thereafter of a copy under printing to the image forming apparatus 10B (S29). The image forming unit 14 of the image forming apparatus 10B prints an image on the recording sheet in accordance with the corrected image data (S30). Thereby, the printing is continuously performed from the first page of the copy under printing. According to the above example, the image data of the second and third copies is printed by the alternative apparatus. In this way, the printing is performed from the first page of the copy, so that even when a failure occurs in the image forming apparatus 10A and the printing cannot be thus continuously performed, it is possible to prevent an image quality from being changed in the same copy.

For example, referring to the density characteristic shown in FIG. 3, when 25% is designated as the yellow density value, the correction unit 32 corrects the corresponding density value to 30%. The corrected image data is printed, so that an image having an actual density value of 25% is printed. Referring to the line width characteristic shown in FIG. 5, when 2 dots are designated as the line width, the correction unit 32 corrects the corresponding line width to one dot. The corrected image data is printed, so that an image having an actual line width of one dot is printed.

Also, when the option 66 (transfer without change) is selected by the user, the processing proceeds to step S27. In step S27, the control unit 28 of the image forming apparatus 10A selects image data of a not-printed page (image data of a next page and thereafter of a printed page), as the transfer data. At this time, when there is image data that is to be printed on the basis of the designated conditions through the correction by the alternative apparatus, the correction unit 32 of the image forming apparatus 10A corrects the image data (density value and line width), based on the printing characteristic information 26 of the image forming apparatus 10B. Then, the image forming apparatus 10A transfers print data including the not-printed image data to the image forming apparatus 10B (S29). Then, the image forming unit 14 of the image forming apparatus 10B prints an image on the recording sheet in accordance with the corrected image data (S30).

Also, when the option 68 (abort) is selected by the user, the control unit 28 of the image forming apparatus 10A aborts the processing.

As described above, the image data is corrected on the basis of the printing characteristic information 26 of the alternative apparatus, so that the image data is printed by the alternative apparatus with the quality (density value, line width) of the printing by the own apparatus being kept. For example, even when the printing methods of the image forming apparatuses 10A, 10B, 10C are different, the printing is performed with the quality being kept.

In the above illustrative embodiment, the configuration of correcting the density value and the line width has been described. However, this is just exemplary. For example, a printing position of an image and a magnification of an image may be corrected. In this case, a test pattern for confirming a characteristic of the printing position is printed by the own apparatus and the alternative apparatus, and an image of the test pattern on the recording sheet is read to measure an actual printing position. Thereby, a correspondence relation between a position (logical position) of an image of the test pattern and an actual printing position is measured. Also for the magnification, a correspondence relation between a magnification (logical magnification) of an image of a test pattern and an actual magnification may be measured. In addition, a characteristic of sunshade (shadow) may be corrected.

In the meantime, the correction of the image data may be performed by the alternative apparatus (the image forming apparatus 10B, in the above illustrative embodiment), not the own apparatus (the image forming apparatus 10A, in the above illustrative embodiment). In this case, the own apparatus is configured to transfer the not-corrected image data to the alternative apparatus. The correction unit 32 of the alternative apparatus is configured to correct the image data, based on the printing characteristic information 26 of the alternative apparatus. The image forming unit 14 of the alternative apparatus is configured to print the corrected image data. Also in this case, the image data is printed by the alternative apparatus with the quality of the printing by the own apparatus being kept.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a storage unit configured to store a reading result of an output of a test pattern made by the image forming apparatus;
   a transmitter configured to transmit the test pattern to another image forming apparatus in advance of transferring print data to the another image forming apparatus;
   an acquirer configured to acquire an optical reading result of an output of the test pattern made by the another image forming apparatus;
   a corrector configured to correct the print data; and
   a transfer unit configured to transfer the print data to the another image forming apparatus,
   wherein, the print data to be output at the another image forming apparatus is transferred to the another image forming apparatus so that the print data is corrected at the another image forming apparatus, or is corrected by the corrector, based on the reading result stored in the storage unit and the optical reading result of the output of the test pattern made by the another image forming apparatus and acquired at the acquirer.

2. The image forming apparatus according to claim 1,
   wherein the quality comprises at least one of a density value and a line width of an image, and
   wherein the corrector corrects at least one of the density value and the line width of the print data.

3. The image forming apparatus according to claim 1, wherein when an instruction to output a plurality of copies is issued, the print data is data of a first page and thereafter of a copy under printing at the image forming apparatus.

4. The image forming apparatus according to claim 1, wherein when data being output at the image forming apparatus includes data which is not output at the another image forming apparatus in the same quality as the image forming apparatus and data to be printed next to the data being output at the image forming apparatus includes the data which is not output at the another image forming apparatus in the same quality as the image forming apparatus, the print data is the data to be printed next to the data being output at the image forming apparatus.

5. The image forming apparatus according to claim 1,
   wherein the print data is not transferred to the another image forming apparatus when the print data includes data which is not output at the another image forming apparatus in the same quality as the image forming apparatus.

6. The image forming apparatus according to claim 1, further comprising a display unit configured to display a confirmation screen when the print data includes data that is not output at the another image forming apparatus in the same quality as the image forming apparatus.

7. A non-transitory computer readable medium storing a program for enabling a computer to function as:
   a storage unit configured to store a reading result of an output of a test pattern made by an image forming apparatus;
   a transmitter configured to transmit the test pattern to another image forming apparatus in advance of transmitting print data to the another image forming apparatus;
   an acquirer configured to acquire an optical reading result of an output of the test pattern made by the another image forming apparatus;
   a corrector configured to correct the print data; and
   a transfer unit configured to transfer the print data to the another image forming apparatus, wherein the print data to be output at the another image forming apparatus is transferred to the another image forming apparatus so that the print data is corrected at the another image forming apparatus, or is corrected by the corrector, based on the reading result stored in the storage unit and the optical reading result of the output of the test pattern made by the another image forming apparatus and acquired at the acquirer.

8. An image forming system comprising a plurality of image forming apparatuses and an image reading unit configured to optically read a test pattern,
   at least one of the image forming apparatuses comprising;

a storage unit configured to store a reading result obtained by optically reading an output of a test pattern made by the at least one of the image forming apparatuses by the reading unit;

a transmitter configured to transmit a test pattern to at least one of the other image forming apparatuses in advance of transferring print data to the at least one of the other image forming apparatuses;

a corrector configured to correct the print data; and a transfer unit configured to transfer the print data to the at least one of the other image forming apparatuses;

the at least one of the other image forming apparatuses comprising:

a receiving unit configured to receive the test pattern from the transmitter and the print data from the transfer unit; and an output unit configured to output the test pattern and the print data;

wherein the at least one of the other image forming apparatuses outputs a test pattern in advance of outputting print data, the at least one of the image forming apparatuses acquires an optical reading result of the output of the test pattern made by the at least one of the other image forming apparatuses by the image reading unit, and the corrector corrects the print data to be output at the at least one of the other image forming apparatuses based on the reading result stored in the storage unit and the optical reading result of the output of the test pattern made by the at least one of the other image forming apparatuses.

9. The image forming system according to claim 8, wherein the print data is print data that has not been continuously printed such that printing of the print data by the at least one of the image forming apparatuses has been aborted, and the at least one of the other image forming apparatuses prints the print data from a beginning of the print data in a case in which the print data includes data that is not output at the at least one of the other image forming apparatuses in the same quality as the at least one of the image forming apparatuses.

10. The image forming system according to claim 8, wherein the print data is print data that has not been continuously printed such that printing of the print data by the at least one of the image forming apparatuses has been aborted, and the at least one of the other image forming apparatuses prints the print data not printed by the at least one of the image forming apparatuses in a case in which the print data does not include data that is not output at the at least one of the other image forming apparatuses in the same quality as the at least one of the image forming apparatuses.

11. The image forming system according to claim 8, wherein the at least one of the image forming apparatuses further comprises a display unit configured to display a confirmation screen when the print data includes data that is not output at the at least one of the other image forming apparatuses in the same quality as the at least one of the image forming apparatuses.

* * * * *